United States Patent
Khair et al.

(10) Patent No.: US 6,293,096 B1
(45) Date of Patent: Sep. 25, 2001

(54) MULTIPLE STAGE AFTERTREATMENT SYSTEM

(75) Inventors: Magdi K. Khair; Charles T. Hare, both of San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 09/339,080

(22) Filed: Jun. 23, 1999

(51) Int. Cl.[7] ........................................ F01N 3/00
(52) U.S. Cl. ................. 60/286; 60/295; 60/297; 60/301; 60/303
(58) Field of Search ............... 60/276, 286, 295, 60/297, 303, 311, 274, 285, 301; 423/237, 239.1

(56) References Cited

U.S. PATENT DOCUMENTS

| | | | |
|---|---|---|---|
| 3,757,521 | * 9/1973 | Tourtellotte et al. | 60/286 |
| 4,902,487 | 2/1990 | Cooper et al. . | |
| 5,052,178 | * 10/1991 | Clerc et al. | 60/286 |
| 5,272,871 | * 12/1993 | Oshima et al. | 60/286 |
| 5,364,606 | 11/1994 | Hung . | |
| 5,412,946 | * 5/1995 | Oshima et al. | 60/303 |
| 5,471,836 | * 12/1995 | Takeshima et al. | 60/285 |
| 5,472,673 | 12/1995 | Goto et al. . | |
| 5,551,231 | * 9/1996 | Tanaka et al. | 60/301 |
| 5,570,576 | 11/1996 | Ament et al. . | |
| 5,572,866 | 11/1996 | Loving . | |
| 5,582,002 | 12/1996 | Pattas . | |
| 5,611,198 | 3/1997 | Lane et al. . | |
| 5,649,421 | 7/1997 | Wakabayashi et al. . | |
| 5,650,127 | * 7/1997 | Campbell et al. | 423/239.1 |
| 5,653,101 | 8/1997 | Lane et al. . | |
| 5,711,147 | 1/1998 | Vogltin et al. . | |
| 5,711,149 | 1/1998 | Araki | 60/286 |
| 5,727,385 | 3/1998 | Hepburn . | |
| 5,746,989 | 5/1998 | Murachi et al. . | |
| 5,750,082 | 5/1998 | Hepburn et al. . | |
| 5,753,188 | 5/1998 | Shimoda et al. . | |
| 5,783,160 | * 7/1998 | Kinugasa et al. | 423/237 |
| 5,798,270 | * 8/1998 | Adamczyk, Jr. et al. | 60/297 |
| 5,809,774 | * 9/1998 | Peter-Hoblyn et al. | 60/286 |
| 5,891,409 | * 4/1999 | Hsiao et al. | 60/301 |
| 5,974,791 | * 11/1999 | Hirota et al. | 60/286 |
| 6,021,639 | * 2/2000 | Abe et al. | 60/297 |
| 6,038,854 | * 3/2000 | Penetrante et al. | 60/297 |
| 6,167,696 | 1/2001 | Maaseidvaag et al. | 60/285 |

* cited by examiner

Primary Examiner—Thomas Denion
Assistant Examiner—Tu M. Nguyen
(74) Attorney, Agent, or Firm—Baker Botts L.L.P.

(57) ABSTRACT

$NO_x$ in an exhaust gas stream is oxidized in a first stage oxidation catalyst thereby forming $NO_2$. In a subsequent stage, the $NO_2$ is directed to a lean $NO_x$ trap whereat $NO_2$ is reduced to $N_2$. Hydrocarbon fuel is controllably injected into the gaseous stream at a position upstream of the lean $NO_x$ trap. Carbon is oxidized in a carbon trap positioned downstream from the lean $NO_x$ trap.

21 Claims, 2 Drawing Sheets

MULTIPLE STAGE AFTERTREATMENT SYSTEM

BACKGROUND OF THE INVENTION

1. Technical Field

This invention relates generally to an aftertreatment system for reducing the amount of $NO_x$ and particulate matter in engine exhaust gases, and more particularly to such a system that oxidizes NO to $NO_2$ in a first stage, reduces a portion of the $NO_2$ to $N_2$ in a second stage, and further reduces a remaining portion of the $NO_2$ to $N_2$ and oxidizes carbon to $CO_2$ in a third stage.

2. History of Related Art

Heretofore, the diesel engine industry has been successful in meeting exceedingly tight emission limits without heavy reliance on expensive exhaust aftertreatment technology. Recently, oxidation catalysts have been used in medium-heavy-duty diesel engine applications to oxidize the soluble organic fraction (SOF) in particulate. Also, even though great strides have been made in controlling the soot emitted from the diesel combustion process, carbonaceous matter in the exhaust stream, generally referred to as particulate matter (PM), continues to make it difficult to meet increasingly stringent proposed particulate limits. Control of soot emissions has been compounded by employing exhaust gas recirculation (EGR) to achieve proposed emission standards.

Using significant EGR rates to achieve very low $NO_x$ emission is forcing some manufacturers to reconsider the use of particulate traps or filters, for their potential in reducing insoluble particulate matter. Oxidation catalysts and traps, with certain limitations on fuel sulfur content, have been combined in a two-stage exhaust aftertreatment system. For example, U.S. Pat. No. 4,902,487 issued Feb. 20, 1990 to Barry J. Cooper, et al. for Treatment of Diesel Exhaust Gases describes an aftertreatment process in which carbonaceous matter is trapped in a filter and oxidized to carbon dioxide. The first stage of the treatment system oxidizes nitrogen oxide (NO) to $NO_2$ by means of a platinum catalyst. Nitrogen dioxide formed in this stage is then used to oxidize carbon that is trapped in the second stage filter. In this two-stage process, the oxidation of carbon is dependent upon the amount of nitrogen dioxide present in the exhaust stream. If an insufficient amount of $NO_2$ is present, complete carbon oxidation does not occur.

U.S. Pat. No. 5,746,989 issued May 5, 1998 to Mikio Murachi, et al. for a Method for Purifying Exhaust Gas of a Diesel Engine, describes a method by which NO (nitrogen oxide) in the exhaust gas stream of a diesel engine is oxidized to $NO_2$ (nitrogen dioxide) by an oxidizing catalyst. Carbon particles in the exhaust gas are trapped by a particulate filter. The exhaust gas containing $NO_2$ is fed to the particulate filter whereat the $NO_2$ reacts with carbon particles trapped in the particulate filter and the carbon particles are oxidized. $NO_2$ is reduced to nitrogen ($N_2$), $H_2O$ (water in a gaseous state) and carbon dioxide ($CO_2$) by enriched fuel mixture combustion in the engine. The oxidizing catalyst uses an electric heater to raise the temperature of the exhaust gas stream to ensure a chemical reaction between the $NO_2$ with the carbon particles in the particulate filter. Also in the Murachi et al. method, it is necessary to periodically purge the $NO_x$ absorbent. This is accomplished by changing the air-fuel ratio of the engine by injecting fuel into each cylinder of the engine twice during each complete cycle, thus creating a relatively low temperature exhaust gas having a rich air-fuel mixture. This practice generally disadvantageously affects the operating characteristics of the engine.

The present invention is directed to overcoming the problems set forth above. It is desirable to have an aftertreatment system for reducing the amount of nitrogen oxide and particulate matter in engine exhaust gases without the need for electric heating elements to increase the temperature of the exhaust gas to periodically regenerate the particulate filter. It is also desirable to have such an aftertreatment system that does not require the injection of additional fuel in each cylinder of the engine to provide additional necessary hydrocarbon to reduce the $NO_x$ to $N_2$ (nitrogen). It is desirable to also have an internal bypass for the $NO_2$ trap to control the rate of $NO_2$ directed to the carbon trap and, accordingly, the amount of $NO_2$ bypassed to the carbon particulate filter.

SUMMARY OF THE INVENTION

In accordance with one aspect of the present invention, a multiple stage aftertreatment system for reducing the amount of $NO_x$ and carbonaceous particulate matter in engine exhaust gases includes a $NO_x$ oxidation catalyst, a lean $NO_x$ trap, a carbon trap, and a hydrocarbon fuel injector. The $NO_x$ oxidation catalyst is positioned to receive exhaust gases discharged from the internal combustion engine and oxidize at least a portion of the $NO_x$ compounds in the exhaust gas to nitrogen dioxide. The lean $NO_x$ trap is adapted to store nitrogen dioxide in the exhaust gas discharged from the catalyst and reduce the nitrogen dioxide to nitrogen and water (in a gaseous state) in the presence of at least a portion of the carbonaceous particulate matter in the engine exhaust gas in combination with supplemental hydrocarbon fuel. As a result of this reaction, at least portions of the carbonaceous particulate matter and the hydrocarbon fuel are oxidized to carbon dioxide. The carbon trap is adapted to oxidize other portions of the carbonaceous particulate matter to carbon dioxide. The hydrocarbon fuel injector is disposed adjacent the lean $NO_x$ trap at a position adapted to control the selected amounts of hydrocarbon fuel into the exhaust gas prior to entry into the lean $NO_x$ trap.

In accordance with another aspect of the present invention, a multiple stage aftertreatment system for reducing the amount of $NO_x$ and particulate matter in engine exhaust gases includes first, second and third stages and a hydrocarbon fuel injector. The first stage is positioned to receive exhaust gases discharged from an internal combustion engine which typically contain NO (nitrogen oxide), $NO_2$ (nitrogen dioxide), HC (hydrocarbons), CO (carbon monoxide), $CO_2$ (carbon dioxide), and PM (particulate matter) in the exhaust. The first stage has a catalyst adapted to oxidize the NO in the exhaust stream and discharge a gaseous stream containing $NO_2$ and PM from the first stage. The second stage of the aftertreatment system is positioned in fluid communication with the first stage described above and is adapted to receive the gaseous stream discharged from the first stage. The second stage includes a trap portion and a bypass portion. The trap portion is adapted to store $NO_2$ discharged from the first stage in a typical lean (oxygen-rich) environment and, in the presence of a supplemental hydrocarbon fuel, reduce the stored $NO_2$ to $N_2$ (nitrogen), $O_2$ (oxygen), $H_2O$ (water in a gaseous state), and $CO_2$ (carbon dioxide) and discharge the $N_2$, $O_2$, $H_2O$, and $CO_2$ and residual unreduced $NO_2$ from the trap portion. The hydrocarbon fuel injector is interposed between the first and second stages at a position adapted to controllably inject selected amounts of hydrocarbon fuel into the gaseous stream discharged from the first stage. The third stage of the aftertreatment system is in fluid communication with the second stage and has a carbon trap adapted to receive $NO_2$ from the bypass portion of the second stage and residual unreduced $NO_2$ from the trap portion of the second stage, and reduce the $NO_2$ to nitrogen, and oxidize the PM and the carbon component to carbon dioxide.

In accordance with yet another aspect of the present invention, a multiple stage aftertreatment system for reducing the amount of $NO_x$ and carbonaceous particulate matter in engine exhaust gases includes a first stage positioned to receive exhaust gases discharged from an internal combustion engine which has $NO_x$ and carbonaceous particulate matter carried therein. The first stage includes a Pt catalyst adapted to oxidize components of the $NO_x$ to form nitrogen dioxide and discharge a gaseous stream from the first stage that contains nitrogen dioxide and carbonaceous particulate matter. The second stage is positioned in fluid communication with the first stage and is adapted to receive the gaseous stream from the first stage that contains nitrogen dioxide and carbonaceous particulate matter. The second stage has a carbon trap adapted to store the carbonaceous particulate matter contained in the gaseous stream received from the first stage, reduce a portion of the nitrogen dioxide contained in the gaseous stream received from the first stage, and simultaneously oxidize the carbon component of the carbonaceous particulate matter contained in the gaseous stream received from the first stage, and discharge a gaseous stream containing nitrogen and carbon dioxide. The third stage is positioned in fluid communication with the second stage and is adapted to receive the gaseous stream containing nitrogen and carbon dioxide from the second stage. The third stage has a lean $NO_x$ trap adapted to store the remaining portion of the nitrogen dioxide discharged from the second stage and, with the addition of a supplemental hydrocarbon fuel, reduce the stored nitrogen dioxide to nitrogen, water in a gaseous state, and carbon dioxide, and discharge a gaseous stream from the multiple stage aftertreatment system that consists essentially of nitrogen, water and carbon dioxide. This aspect of the present invention includes a hydrocarbon fuel injector interposed between the second and third stages at a position adapted to controllably inject selected amounts of hydrocarbon fuel into the gaseous stream discharged from the second stage prior to the gaseous stream being received by the third stage.

Other features of the multiple-stage aftertreatment system embodying the present invention include the system having a $NO_x$ sensor positioned to sense the $NO_x$ content of the gaseous stream subsequent to discharge from the lean $NO_x$ trap portion of the system. Additional features include the first stage catalyst being a rare earth metal selected from the group containing platinum and palladium, and the lean $NO_x$ trap portion containing an oxide of a base metal such as barium.

Still another feature includes the hydrocarbon fuel injector being a diesel fuel injector in fluid communication with a pressurized source of diesel fuel. Another feature includes the carbon trap being a wallflow trap formed of cordierite ceramic material.

BRIEF DESCRIPTION OF THE DRAWINGS

A more complete understanding of the operation and structure of the present invention may be had by reference to the following detailed description when taken in conjunction with the accompanying drawings, wherein.

DETAILED DESCRIPTION OF THE INVENTION

Figure 1:
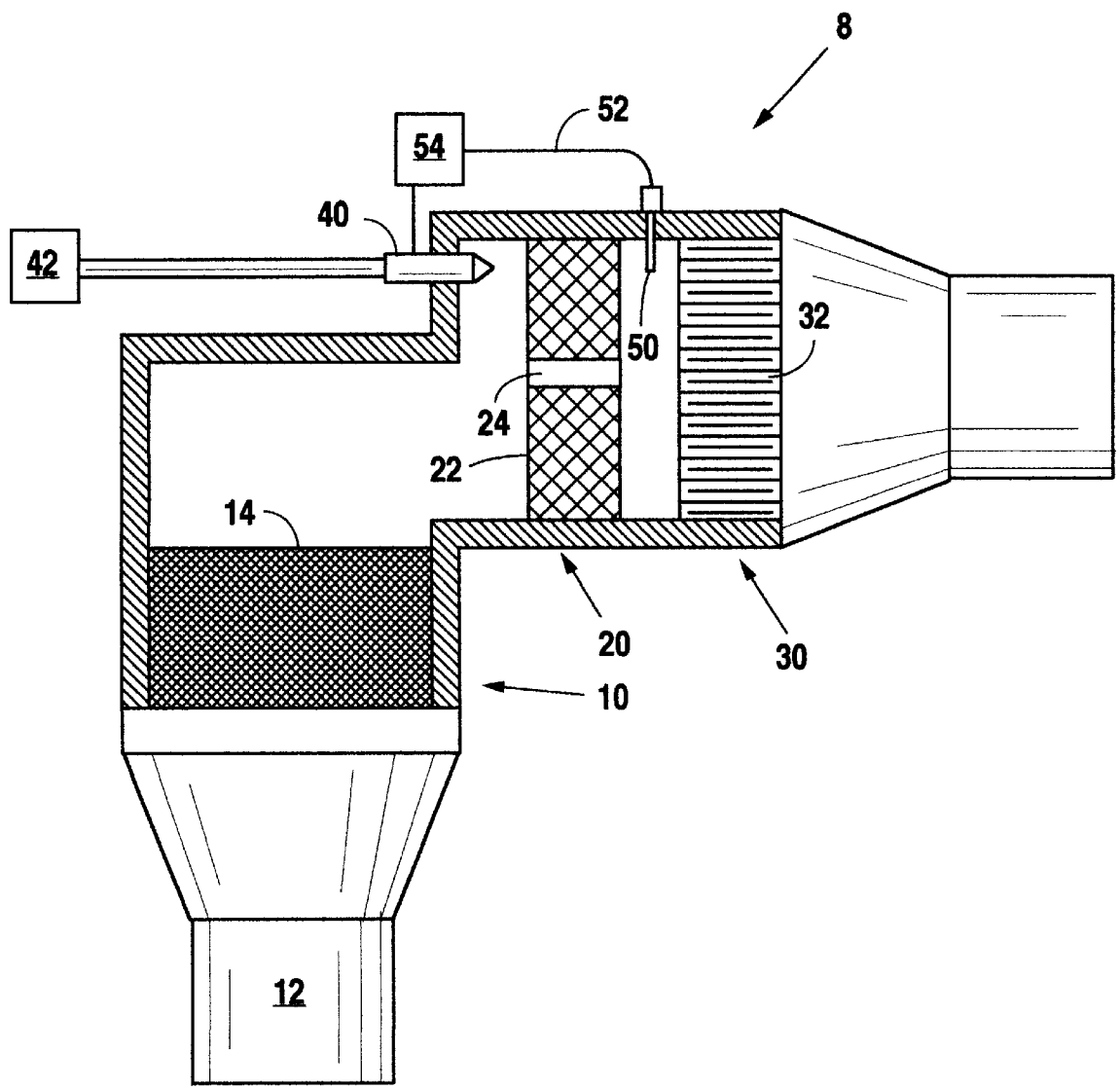
FIG. 1 is a schematic representation of a first embodiment of the multiple stage aftertreatment system embodying the present invention.

A first preferred embodiment of the aftertreatment system embodying the present invention is generally indicated by reference numeral 8 in FIG. 1, and effectively combines the functions of a CRT (catalytically regenerated trap), a LNT (lean $NO_x$ trap) and a carbon trap in a single system for the reduction of both $NO_x$ (nitrogen oxides) and PM (particulate matter) emissions. The aftertreatment system embodying the present invention is particularly adapted to operate in lean air-fuel ratio engines, such as diesel engines, and advantageously uses the excess oxygen present in the exhaust stream of such lean burn engines to reduce the amount of $NO_x$ and carbonaceous particulate matter discharged into the atmosphere. The first preferred embodiment of the aftertreatment system 8, is represented schematically in FIG. 1 of the drawings, and includes a first stage 10, a second stage 20, a third stage 30, and a hydrocarbon fuel injector 40 interposed between the first stage 10 and the second stage 20.

The first stage 10 has an inlet 12 which is adapted to receive exhaust gases discharged from an internal combustion engine, such as a diesel engine (not shown). Typically, the exhaust gas from a diesel engine contains various oxides of nitrogen ($NO_x$), particularly NO (nitrogen oxide) and $NO_2$ (nitrogen dioxide), as well as HC (hydrocarbons), CO (carbon monoxide), $CO_2$ (carbon dioxide), PM (particulate matter), and other products of the combustion process. The first stage 10 of the aftertreatment system includes an oxidation catalyst 14, preferably a rare earth metal such as platinum or palladium. The catalyst 14 oxidizes the NO in the exhaust g as stream, in the presence of the catalyst, to $NO_2$. This reaction is represented by Formula 1:

$$NO + \tfrac{1}{2}O_2 = NO_2 \tag{1}$$

Thus, $NO_2$ (nitrogen dioxide) is formed and is carried into the second stage 20 of the aftertreatment system 8.

The second stage 20 of the aftertreatment system 8 includes a first portion 22 and a second portion 24. The first portion 22 contains a lean $NO_x$ trap (LNT), such as described in the above-referenced U.S. Pat. No. 5,746,989 to Murachi et al. The lean $NO_x$ trap stores $NO_2$ under lean fuel-air mixture (i.e., oxygen-rich) engine operation, then reduces the stored $NO_2$ to $N_2$ and $O_2$ under rich fuel-air conditions. In most diesel applications, rich fuel-air conditions do not frequently occur during normal over-the-road or other relatively steady state operation. In the present invention, the portion of the $NO_2$ stored in the LNT 22 of the second stage 20 combines with the supplemental HC provided by the periodic injection of supplemental HC (hydrocarbon fuel) upstream of the second stage 20 to form $N_2$, $H_2O$ and $CO_2$. The reduction of $NO_2$ in the second stage is represented by Formula 2:

$$NO_2 + HC + O_2 \rightarrow N_2 + H_2O = CO_2 \tag{2}$$

With continued reference to FIG. 1, the hydrocarbon fuel injector 40 is in fluid communication with a source 42 of pressurized hydrocarbon fuel, for example diesel fuel such as that used in the normal operation of the engine. The reduction conversion efficiency of $NO_2$ to $N_2$ and $O_2$ in the second stage is typically somewhat less than 100% and therefore, some $NO_2$ is expected to escape the LNT 22 and pass on to the third stage 30. Another portion of the $NO_2$ formed in the first stage 10 bypasses the LNT 22 of the second stage by being directed through the second portion bypass 24 of the second stage 20. The size of the bypass 24 can be readily determined by experimentation for specific applications to ensure good $NO_x$ and PM emission reduction.

The third stage 30 of the aftertreatment system 8 in the first embodiment of the present invention includes a carbon trap oxidizer 32 such as a ceramic cordierite wallflow trap. In the carbon trap oxidizer 32, the $NO_2$ reacts with carbon in the trap and forms $CO_2$ and $N_2$. Thus, the unconverted $NO_2$ from the first portion 22 of the second stage 20, as well as bypassed $NO_2$ passing through the second portion 24 of the second stage 22, is reduced to nitrogen and $CO_2$ and is represented below by Formula 3:

$$2NO_2 + 2C \rightarrow N_2 + 2CO_2 \qquad (3)$$

Thus, in the first stage 10 of the multiple stage aftertreatment system 8 in the first embodiment of the present invention, NO resulting from the diesel combustion process combines with excess oxygen in the exhaust gas stream to form $NO_2$, aided by the catalyst 14 in the first stage 10. In the second stage 20, a lean $NO_x$ trap stores the $NO_2$ formed by the oxidation catalyst 14 of the first stage 10. The stored $NO_2$ then combines with supplemental HC, injected by the injector 40 to form $N_2$, $H_2O$, and $CO_2$. Unconverted as well as bypassed $NO_2$ then proceed to the carbon trap oxidizer 32 of the third stage 30, where $NO_2$ is reduced to $N_2$ and carbon is oxidized to $CO_2$. $NO_2$ is stored in the LNT portion 22 of a second stage 20 as long as the exhaust is lean (oxygen-rich). As the LNT portion 22 reaches its $NO_2$ storage capacity limits, the fuel injector 40, positioned just upstream of the LNT portion 22, delivers supplemental hydrocarbon in the form of diesel fuel, thereby reducing $NO_2$ to $N_2$.

Switching from the $NO_2$ storage mode to the reducing mode is preferably controlled by the use of a $NO_x$ sensor 50 positioned in the exhaust downstream of the second stage 20, and preferably between the second stage 20 and the third stage 30. The $NO_x$ sensor 50 senses the $NO_x$ content of the exhaust stream and is thereby capable of indirectly detecting engine load. The $NO_x$ sensor 50 delivers an electrical signal 52 to a programmable controller 54 which conditions the electrical signal 52 and controls the operation of the hydrocarbon fuel injector 40. Thus, fuel can be controllably injected into the aftertreatment system 8 under desired engine operating conditions to enhance the performance of the LNT portion 22 of the second stage. An alternative to sensing $NO_x$ is measuring exhaust gas temperature for use as an indicator of engine speed and load. $NO_x$ formation in diesel engines is a function of engine temperature, generally increasing as the combustion temperature increases, and thus it can be inferred that $NO_x$ formation is taking place at a high rate under high temperature engine operating conditions. At such times, supplemental diesel fuel can be injected to reduce the $NO_x$ emissions. It is highly desirable that the fuel used for engine operation be a low sulfur fuel to prevent damage to highly active catalysts in the system.

Figure 2:
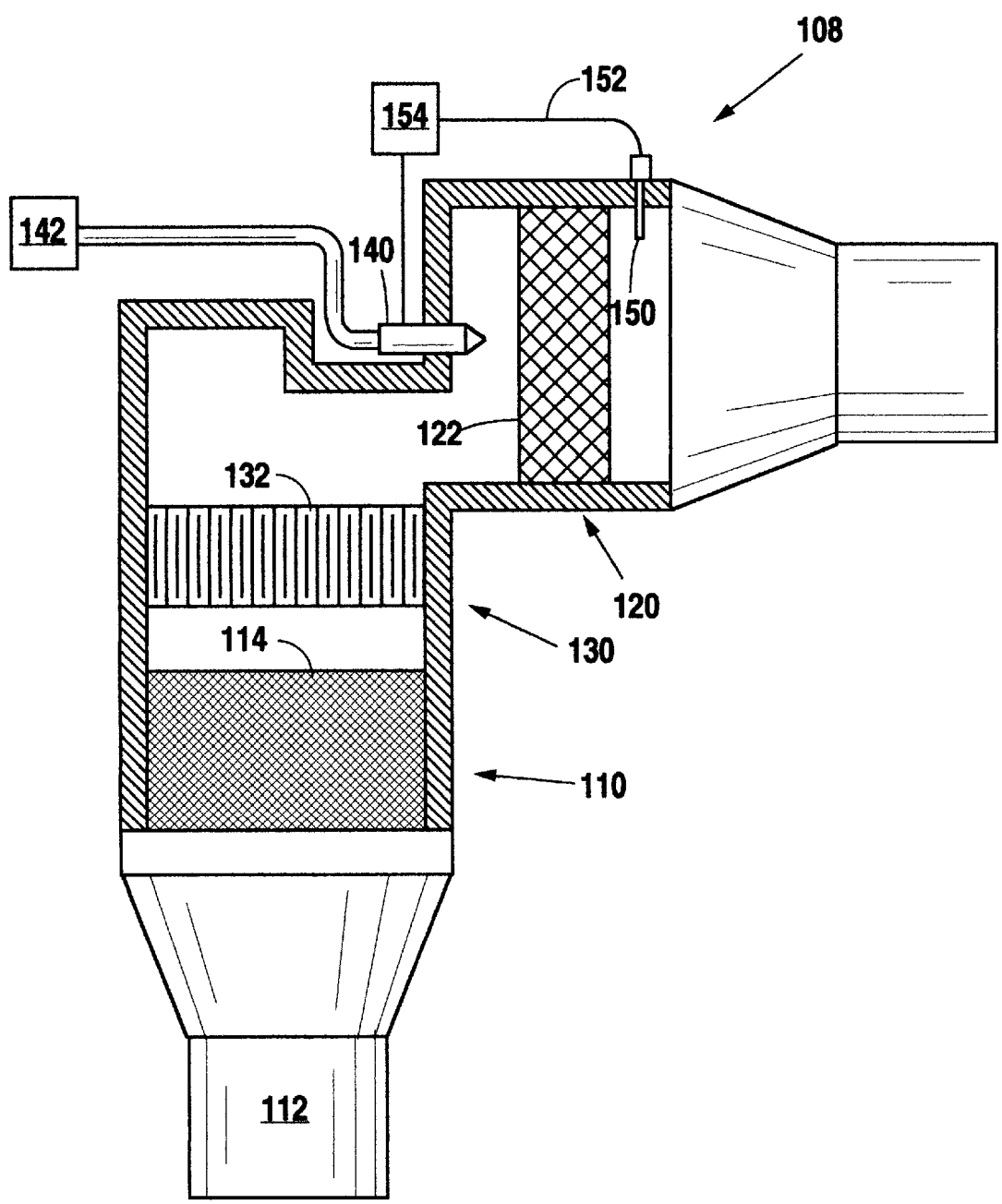
FIG. 2 is a schematic representation of a second embodiment of the multiple stage aftertreatment system embodying the present invention.

A second preferred embodiment of the aftertreatment system embodying the present invention is indicated by reference numeral 108 in FIG. 2. In the second embodiment, the lean $NO_x$ trap and carbon trap are reversed with respect to their respective positions in the first embodiment, but still effectively produce the same desirable reduction in both $NO_x$ and particulate matter in the exhaust emission stream. As in the first embodiment, the first stage 110 includes an oxidation catalyst 114 positioned just downstream of an inlet 112. The catalyst 114 oxidizes the NO in the exhaust stream in the presence of the catalyst, to $NO_2$. Thus, the reaction that takes place in the first stage of the second embodiment is the same as that shown in Formula 1, above, with respect to the reaction taking place in the first stage of the first embodiment.

In the second embodiment, the second stage 130 includes a carbon trap oxidizer 132, such as a ceramic cordierite wallflow trap. In the carbon trap 132, $NO_2$ in the gas stream discharged from the first stage reacts with the carbon component of the carbonaceous particulate matter in the exhaust gas stream, reducing at least a portion of the $NO_2$ to $N_2$ and simultaneously oxidizing the carbon to form carbon dioxide ($CO_2$). The amount of $NO_2$ reduced is dependent upon the amount of carbon present, and therefore, the reduction of $NO_2$ to $N_2$ may not be 100%. That is, the exhaust gas stream discharged from the second stage 132 usually will contain both reduced $NO_2$ ($N_2$) and oxidized carbon ($CO_2$) as well as some residual nitrogen dioxide ($NO_2$), as represented below by Formula 4:

$$2NO_2 + 2C + NO_2 \rightarrow N_2 + 2CO_2 + NO_2 \qquad (4)$$

With continued reference to FIG. 2, the third stage 120 includes a lean $NO_x$ trap (LNT) 122. The gas stream emitted from the second stage 130, containing nitrogen, carbon dioxide and a remaining portion of nitrogen dioxide passes through the third stage 120. The third stage lean $NO_x$ trap is arranged to store the remaining portion of the nitrogen dioxide discharged from the second stage, and with the addition of a supplemental hydrocarbon fuel, reduce the stored nitrogen dioxide to nitrogen, water in a gaseous state, and carbon dioxide, and discharge a gaseous stream from the multiple stage aftertreatment system 108 that consists essentially of nitrogen, water and carbon dioxide. This reaction is represented above by Formula 2.

The second embodiment of the multiple stage aftertreatment system 108, includes a hydrocarbon fuel injector 140 that is positioned between the second stage 130 and the third stage 120 at a position adapted to controllably inject selected amounts of hydrocarbon fuel, from a pressurized source 142, into the gaseous stream discharged from the second stage 130, prior to the gaseous stream being received by the third stage 120. As described above, the lean $NO_x$ trap 122 stores the remaining portion of the $NO_2$, then combines the stored $NO_2$ with supplemental HC, injected by the injector 140 to form $N_2$, $H_2O$ and $CO_2$. $NO_2$ is stored in the lean $NO_x$ trap portion 122 of the third stage 120 when the exhaust is lean (oxygen-rich). As the lean $NO_x$ trap portion 122 reaches its $NO_2$ storage capacity limits, the fuel injector 140, positioned just upstream of the lean $NO_x$ trap 122 delivers supplemental hydrocarbon (HC) in the form of diesel fuel, thereby inducing $NO_2$ reduction to $N_2$.

Switching the $NO_2$ storage mode to the reducing mode is preferably controlled, as described above, by the use of a $NO_x$ sensor 150 positioned in the exhaust downstream of the third stage 120. The $NO_x$ sensor 150 senses the $NO_x$ content of the exhaust stream and is thereby capable of indirectly determining engine load. The $NO_x$ sensor 150 delivers an electrical signal 152 to a programmable controller 154 which conditions the electrical signal 152 and controls the operation of the hydrocarbon fuel injector 140. Thus, fuel can be controllably injected into the aftertreatment system 108 under desired engine operating conditions to enhance the performance of the lean $NO_x$ trap portion 122 of the third stage 120.

The multiple stage aftertreatment system embodying the present invention thus combines the functions of a catalytically regenerated trap (CRT) with a lean $NO_x$ trap (LNT) in a single system for the reduction of both $NO_x$ and PM emissions. The present invention effectively maximizes the common features of both systems, such as a rare earth catalyst and its $NO_2$ formation capability.

Other aspects, features and advantages of the present invention can be obtained from a study of this disclosure together with the appended claims.

What we claim is:

1. A multiple stage aftertreatment system for reducing the amount of $NO_x$ and carbonaceous particulate matter in engine exhaust gases, comprising:
   a platinum oxidation catalyst positioned to receive exhaust gas discharged from an internal combustion engine and adapted to oxidize at least a portion the $NO_x$ compounds in said exhaust gas to nitrogen dioxide;
   a lean $NO_x$ trap adapted to store nitrogen dioxide in said exhaust gas discharged from said $NO_x$ oxidation catalyst and reduce the nitrogen dioxide to nitrogen and water in a gaseous state in the presence of at least a portion of the carbonaceous particulate matter in the engine exhaust gas in cooperation with supplemental hydrocarbon fuel whereby at least portions of said carbonaceous particulate matter and said hydrocarbon fuel are oxidized to carbon dioxide;
   a carbon trap adapted to oxidize other portions of the carbonaceous particulate matter in said exhaust gas to carbon dioxide; and
   a hydrocarbon fuel injector disposed downstream the platinum oxidation catalyst and upstream the lean $NO_x$ trap at a position adapted to controllably inject selected amounts of hydrocarbon fuel into a said exhaust gas prior to entry into said lean $NO_x$ trap and thereby provide said supplemental hydrocarbon fuel to said lean $NO_x$ trap.

2. The multiple stage aftertreatment system set forth in claim 1 wherein said system includes a $NO_x$ sensor positioned to sense the $NO_x$ content of said exhaust gas subsequent to discharge from the lean $NO_x$ trap.

3. The multiple stage aftertreatment system set forth in claim 1 wherein said $NO_x$ oxidation catalyst is a rare earth metal selected from the group consisting of platinum and palladium.

4. The multiple stage aftertreatment system set forth in claim 1 wherein said lean $NO_x$ trap contains an oxide of a base metal.

5. The multiple stage aftertreatment system set forth in claim 4 wherein said base metal is barium oxide.

6. The multiple stage aftertreatment system set forth in claim 1 wherein said hydrocarbon fuel injector is a diesel fuel injector in fluid communication with a pressurized source of diesel fuel.

7. The multiple stage aftertreatment system, as set forth in claim 1, wherein said carbon trap is a wallflow trap formed of cordierite ceramic material.

8. A multiple stage aftertreatment system for reducing the amount of $NO_x$ and carbonaceous particulate matter in engine exhaust gases, comprising:
   a first stage positioned to receive exhaust gases discharged from an internal combustion engine having $NO_x$ and carbonaceous particulate matter carried therein, said $NO_x$ having nitrogen oxide as one component thereof and said first stage having a $NO_x$ oxidation catalyst adapted to oxidize the nitrogen oxide to nitrogen dioxide and discharge a gaseous stream containing nitrogen dioxide and carbonaceous particulate matter from said first stage;
   a second stage positioned in fluid communication with said first stage and adapted to receive said gaseous stream containing nitrogen dioxide and carbonaceous particulate matter from said first stage, said second stage having a lean $NO_x$ trap portion and a bypass portion, said lean $NO_x$ trap portion being adapted to store said nitrogen dioxide discharged from said first stage and reduce at least a portion of the nitrogen dioxide by reaction with the carbonaceous particulate matter and oxidize at least a portion of the carbonaceous particulate matter, thereby forming a gaseous mixture containing nitrogen, water in a gaseous state, and carbon dioxide and discharge a gaseous stream containing nitrogen, water, carbon dioxide, residual unreduced nitrogen dioxide and carbon from the lean $NO_x$ trap portion;
   a hydrocarbon fuel injector interposed between said first and second stages at a position adapted to controllably inject selected amounts of hydrocarbon fuel into said gaseous stream discharged from said first stage having a $NO_x$ oxidation catalyst, immediately prior to the entry of said gaseous stream into said second stage having a lean $NO_x$ trap portion and a bypass portion; and
   a third stage in fluid communication with said second stage and having a carbon trap adapted to receive nitrogen dioxide from the bypass portion of the second stage and nitrogen, water, carbon dioxide, and residual unreduced nitrogen dioxide and carbon from the lean $NO_x$ trap portion of the second stage, and reduce the nitrogen dioxide and oxidize residual carbon, and discharge a gaseous stream comprising nitrogen, carbon dioxide and water vapor from said aftertreatment system.

9. The multiple stage aftertreatment system set forth in claim 8 wherein said system includes a $NO_x$ sensor positioned to sense the $NO_x$ content of said gaseous stream subsequent to discharge from the second stage of the system.

10. The multiple stage aftertreatment system set forth in claim 8 wherein said first stage oxidation catalyst is a rare earth metal selected from the group consisting of platinum and palladium.

11. The multiple stage aftertreatment system set forth in claim 8 wherein said lean $NO_x$ trap portion of the second stage contains an oxide of a base metal.

12. The multiple stage aftertreatment system set forth in claim 11 wherein said base metal is barium oxide.

13. The multiple stage aftertreatment system set forth in claim 8 wherein said hydrocarbon fuel injector is a diesel fuel injector in fluid communication with a pressurized source of diesel fuel.

14. The multiple stage aftertreatment system set forth in claim 8, wherein said carbon trap is a wallflow trap formed of cordierite ceramic material.

15. A multiple stage aftertreatment system for reducing the amount of $NO_x$ and carbonaceous particulate matter in engine exhaust gases, comprising:
   a first stage positioned to receive exhaust gases discharged from an internal combustion engine and having $NO_x$ and carbonaceous particulate matter carried therein, said $NO_x$ having nitrogen oxide as one component thereof and said first stage having a $NO_x$ oxidation catalyst adapted to oxidize the nitrogen oxide to nitrogen dioxide and discharge a gaseous stream containing nitrogen dioxide and carbonaceous particulate matter from said first stage;
   a second stage positioned in fluid communication with said first stage and adapted to receive said gaseous stream containing nitrogen dioxide and carbonaceous particulate matter from said first stage, said second stage having a carbon trap adapted to store said carbonaceous particulate material contained in the gaseous stream received from said first stage, reduce a portion of the nitrogen dioxide contained in said gaseous stream received from the first stage, simultaneously oxidize the carbon component of said carbonaceous particulate matter contained in the gaseous stream received from said first stage, and discharge a gaseous stream containing nitrogen, carbon dioxide and a remaining portion of nitrogen dioxide from said second stage;

a third stage positioned in fluid communication with said second stage and adapted to receive said gaseous stream containing nitrogen, carbon dioxide and the remaining portion of nitrogen dioxide from said second stage, said third stage having a lean $NO_x$ trap adapted to store said remaining portion of the nitrogen dioxide discharged from said second stage and, with the addition of a supplemental hydrocarbon fuel, reduce the stored nitrogen dioxide to nitrogen, water in a gaseous state, and carbon dioxide and discharge a gaseous stream from said system consisting essentially of nitrogen, water, and carbon dioxide; and a hydrocarbon fuel injector interposed downstream the first stage and upstream the third stage at a position adapted to controllably inject selected amounts of hydrocarbon fuel into said gaseous stream discharged from said second stage having a carbon trap adapted to store carbonaceous particulate material, prior to said gaseous stream being received by said under third stage having a lean $NO_x$ trap.

16. The multiple stage aftertreatment system set forth in claim 15 wherein said system includes a $NO_x$ sensor positioned to sense the $NO_x$ content of said gaseous stream subsequent to discharge from the third stage of the system.

17. The multiple stage aftertreatment system set forth in claim 15 wherein said first stage $NO_x$ oxidation catalyst is a rare earth metal selected from the group consisting of platinum and palladium.

18. The multiple stage aftertreatment system set forth in claim 15 wherein said hydrocarbon fuel injector is a diesel fuel injector in fluid communication with a pressurized source of diesel fuel.

19. The multiple stage aftertreatment system set forth in claim 15 wherein said carbon trap of the second stage is a wallflow trap formed of cordierite ceramic material.

20. The multiple stage aftertreatment system set forth in claim 15 wherein said lean $NO_x$ trap portion of the third stage contains an oxide of a base metal.

21. The multiple stage aftertreatment system set forth in claim 20 wherein said base metal is barium oxide.

\* \* \* \* \*